(12) United States Patent
Price, Jr. et al.

(10) Patent No.: US 6,297,921 B1
(45) Date of Patent: Oct. 2, 2001

(54) WRITE DRIVER CIRCUIT HAVING PROGRAMMABLE OVERSHOOT AND UNDERSHOOT

(76) Inventors: John J. Price, Jr., 6500 Gleason Rd., Edina, MN (US) 55439; Donald J. Schulte, 3865 Westbury La., Eagan, MN (US) 55123

( * ) Notice: Subject to any disclaimer, the term of this patent is extended or adjusted under 35 U.S.C. 154(b) by 0 days.

(21) Appl. No.: 09/292,502

(22) Filed: Apr. 15, 1999

Related U.S. Application Data

(60) Provisional application No. 60/103,516, filed on Oct. 8, 1998.

(51) Int. Cl.[7] .................................. G11B 5/02; G11B 5/09
(52) U.S. Cl. ................................................. 360/68; 360/46
(58) Field of Search ........................ 360/46, 68; 327/110

(56) References Cited

U.S. PATENT DOCUMENTS

| | | | |
|---|---|---|---|
| 5,869,988 | 2/1999 | Jusuf et al. | 327/110 |
| 6,125,607 | * 4/2001 | Ngo | 360/46 |
| 6,128,146 | * 10/2000 | Ngo | 360/46 |

* cited by examiner

Primary Examiner—Regina Y. Neal
(74) Attorney, Agent, or Firm—Kinney & Lange, P.A.

(57) ABSTRACT

Undershoot and overshoot control circuitry is provided in a write driver circuit to enhance its efficiency and ability to quickly change directions of write current through a write head. The undershoot and overshoot control circuitry includes: (1) an undershoot reduction circuit, which adds current to the write current when one head terminal has a voltage higher than the opposite head terminal and the input signals are in a certain state, indicating that the write current waveform is about to experience some level of undershoot; (2) an overshoot enhancement circuit, which adds current to the write current when one of the head terminals has a voltage lower than a predetermined threshold, indicating that the write current waveform is about to experience some level of overshoot; and (3) an overshoot reduction circuit, which provides a resistance between the head terminals in parallel with the write head to damp overshoot, when one of the head terminals has a voltage lower than a predetermined threshold, indicating that the write current waveform is about to experience some level of overshoot. The predetermined thresholds, the currents added to the write current, and the resistance provided are all programmable in one embodiment, so that the undershoot and overshoot of the write driver circuit may be precisely controlled for efficient operation.

24 Claims, 5 Drawing Sheets

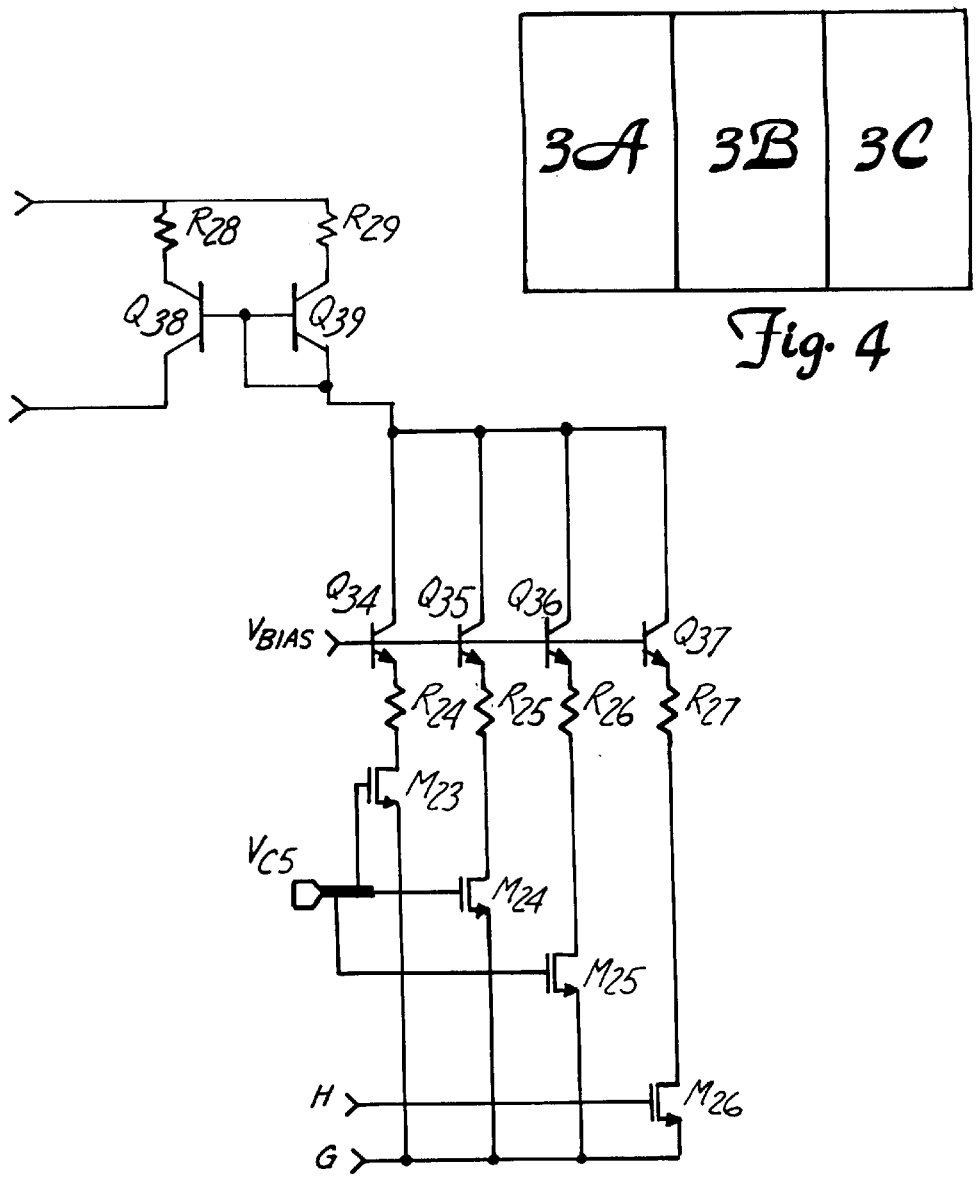
Fig. 4
Fig. 3C
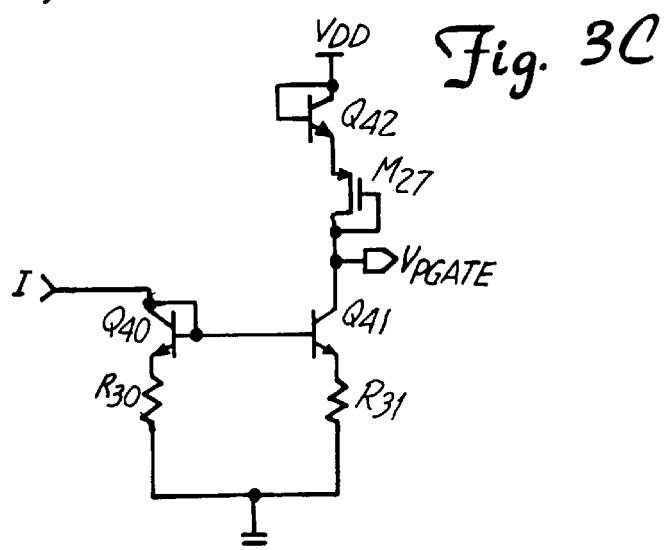

US 6,297,921 B1

WRITE DRIVER CIRCUIT HAVING PROGRAMMABLE OVERSHOOT AND UNDERSHOOT

CROSS-REFERENCE TO RELATED APPLICATION(S)

This application claims priority of Provisional Application No. 60/103,516 filed Oct. 8, 1998 for "Overshoot and Undershoot Control of Write Current Through a Magnetic Write Head" by John J. Price, Jr. and Donald J. Schulte.

This application is related to Application No. 09/292,294, now U.S. Pat. No. 6,184,727 for "Write Driver Circuit Having Enhanced Switching Control Circuitry" filed on even date herewith by John J. Price, Jr. and Application No. 09/292,557, now U.S. Pat. No. 6,133,768 for "Breakdown Voltage Compensation Circuit for Write Driver Transitions" filed on even date herewith by John. J. Price, Jr. and Donald J. Schulte.

BACKGROUND OF THE INVENTION

This invention relates to write current drivers, and particularly to improvements in H-switch circuits used to supply write current to magnetic recording heads.

H-switch drivers are used in magnetic disk drives to supply write current to the magnetic recording head to write data to recording disks. The H-switch is characterized by two or four transistor switches or the like, each forming a leg of the H, with the write head coil being connected to terminals across the center span of the H. Current is directed in either a first direction or a second opposite direction through the head's coil by selectively operating the semiconductor switches to conduction. There are two primary goals in the design of an H-switch circuit—a fast transition between current directions and fast settling of the write current to its quiescent value after switching. These parameters are affected by two phenomena known as overshoot and undershoot. Overshoot is the amount by which the write current exceeds its quiescent value immediately following a transition. Undershoot is caused by ringing in the write current waveform following a transition, and measures the amount by which the write current falls below its quiescent value following an occurrence of overshoot, as the write current is ringing and settling to its quiescent value.

Write driver circuits have been introduced that attempt to reduce overshoot and/or undershoot by damping the ringing of the write current waveform following a transition in write current direction. For example, one known solution to the ringing problem has been to connect a damping resistor across the terminals of the write head. While resistive damping reduces the settling time for the write current signal flowing through the head, continuous provision of a damping resistor increases rise time in the write current transition. Other circuits have also been designed in an attempt to reduce overshoot and/or undershoot as much as possible. However, there may be some advantages to a certain amount of overshoot designed into the write driver circuit, since higher levels of overshoot typically reduce the rise time of the write current in a transition. There is a need in the art for a write driver circuit that provides the ability to programmably control the level of overshoot and undershoot in the operation of the circuit, to improve the overall performance of the circuit.

BRIEF SUMMARY OF THE INVENTION

The present invention is an overshoot and undershoot control system for improving the efficiency of a write current driver circuit that includes a switching mechanism directing write current in opposite directions through a write head between first and second terminals. According to a first aspect of the invention, circuitry for enhancing overshoot is provided. A monitoring circuit detects a voltage at the first and second terminals. An overshoot enhancement circuit is responsive to the monitoring circuit add an overshoot control current to the write current upon detection of a voltage at one of the first and second terminals below a predetermined threshold. According to a second aspect of the invention, circuitry for reducing overshoot is provided. A monitoring circuit detects a voltage at the first and second terminals. An overshoot reduction circuit is responsive to the monitoring circuit to provide a resistance between the first and second terminals in parallel with the write head upon detection of a voltage at one of the first and second terminals below a predetermined threshold. According to a third aspect of the invention, circuitry for reducing undershoot is provided. A monitoring circuit detects a voltage difference between the first and second terminals. An undershoot reduction circuit is responsive to the monitoring circuit to add an undershoot reduction current to the write current based on a state of first and second input signals controlling the switching mechanism and a detected voltage difference between the first and second terminals.

BRIEF DESCRIPTION OF THE DRAWINGS

FIGS. 3A, 3B and 3C are circuit diagrams showing portions of the overshoot/undershoot control circuitry of an embodiment of the present invention.

FIG. 4 is a diagram illustrating the relationship between FIGS. 3A, 3B and 3C.

DETAILED DESCRIPTION

Figure 1:
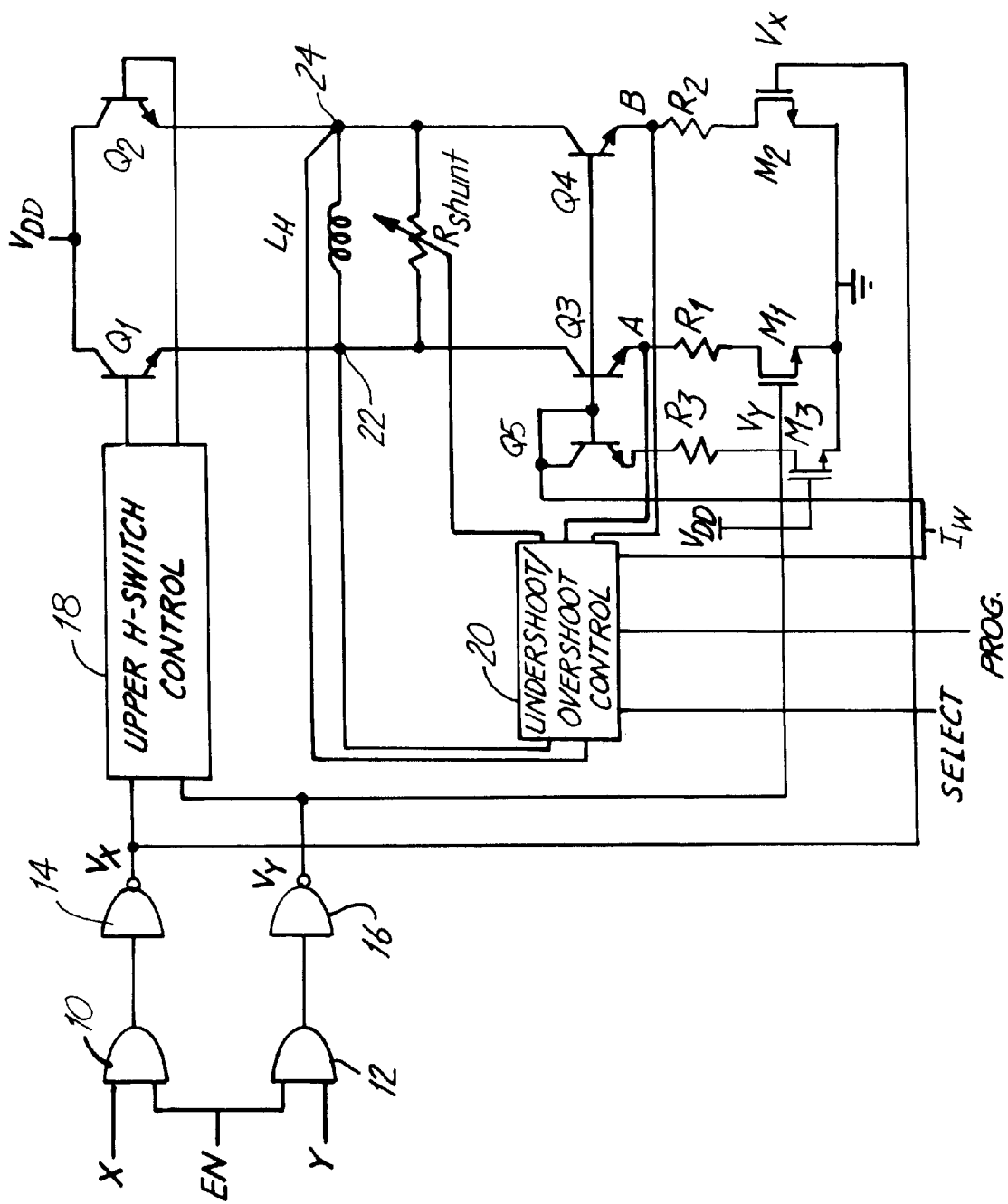
FIG. 1 is a block/circuit diagram of an H-switch write current driver circuit employing an overshoot/undershoot control circuit according to the present invention.

FIG. 1 is a block/circuit diagram of an H-switch write current driver circuit. The driver circuit, in its most basic form, comprises NPN transistors $Q_1$–$Q_4$. Transistors $Q_1$ and $Q_2$ have their collectors connected to voltage source $V_{DD}$ and their emitters connected to respective terminals 22 and 24. Transistors $Q_3$ and $Q_4$ have their collectors connected to terminals 22 and 24. Transistors $Q_3$ and $Q_4$ also form current mirrors with NPN transistor $Q_5$ which is connected to a write current source $I_W$ to mirror the write current into transistors $Q_3$ and $Q_4$. The emitter of transistor $Q_5$ is connected to ground through resistor $R_3$ and MOSFET $M_3$, with the gate of MOSFET $M_3$ being connected to voltage source $V_{DD}$. The current mirrors are completed through the emitters of $Q_3$ and $Q_4$, optional degeneration resistors $R_1$ and $R_2$ and respective MOSFETs $M_1$ and $M_2$ connected to ground. Inductive load $L_H$ is connected between terminals 22 and 24. Data signals representing data to be recorded are provided at terminals X and Y to the inputs of respective AND gates 10 and 12, the second input of each AND gate 10 and 12 being connected to receive a write enable signal. The data signals are inverted by inverters 14 and 16 to derive transistor driving signals $V_X$ and $V_Y$ which are supplied through upper H-switch control circuit 18 to selectively operate one or the other of transistors $Q_1$ and $Q_2$, and to the control terminals of MOSFETs $M_1$ and $M_2$ to selectively operate one or the other of current mirrors $Q_3$ and $Q_4$. Upper H-switch control 18 is described in greater detail in FIG. 2. Undershoot/overshoot control 20 is connected to inductive load $L_H$, to the emitters of transistors $Q_3$ and $Q_4$, and to the control terminal of resistor $R_{shunt}$ to selectively operate and program the overshoot and undershoot of the H-switch circuit. Overshoot/undershoot control 20 is described in more detail below with respect to FIGS. 3A, 3B and 3C.

The H-switch is a symmetrical circuit, with the two write current paths being electrically balanced. Thus, the current path through transistor $Q_1$, terminal 22, load $L_H$, terminal 24, transistor $Q_4$, resistor $R_2$ and MOSFET $M_2$ exhibits the same resistance, capacitance (including parasitic capacitance), inductance and switching characteristics, as the current path through transistor $Q_2$, terminal 24, load $L_H$, terminal 22, transistor $Q_3$, resistor $R_1$ and MOSFET $M_1$. Where a current mirror is employed to supply write current to the load, as in the case of the circuit illustrated in FIG. 1, the mirror usually employs a scaling ratio to scale up the write current $I_W$ supplied to the current mirror driver $Q_5$ to some multiple of $I_W$ to supply to the load.

The H-switch write current driver illustrated in FIG. 1 is operated by applying complementary data signals X and Y to AND gates 10 and 12 to selectively operate transistors $Q_1$ and $Q_2$ and MOSFETs $M_1$ and $M_2$. Thus, when $V_X$ is high and $V_Y$ is low, upper H-switch control 18 operates transistor $Q_1$ to conduction and operates transistor $Q_2$ to non-conduction. Additionally, MOSFET $M_2$ is operated to conduction so that current mirror transistor $Q_4$ provides scaled-up write current $I_W$ to flow through load $L_H$ in the direction from terminal 22 to terminal 24, while MOSFET $M_1$ is operated to non-conduction so that current mirror transistor $Q_3$ is inhibited from providing current to the load. Conversely, when $V_Y$ is high and $V_X$ is low, upper H-switch control 18 operates transistor $Q_2$ to conduction and transistor $Q_1$ to non-conduction, MOSFET $M_1$ is operated to conduction permitting current mirror transistor $Q_3$ to provide current through inductive load L in the direction from terminal 24 to terminal 22, and MOSFET $M_2$ is operated to non-conduction to inhibit current mirror transistor $Q_4$ from supplying current to the load. Parasitic capacitances associated with transistors $Q_1$–$Q_4$ react with the inductive load to cause overshoot and/or undershoot in the write current upon transition. Overshoot/undershoot control 20 serves to selectively program overshoot/undershoot of the write current, and includes selectively operating shunt resistor $R_{shunt}$ in parallel with the inductive load.

Figure 2:
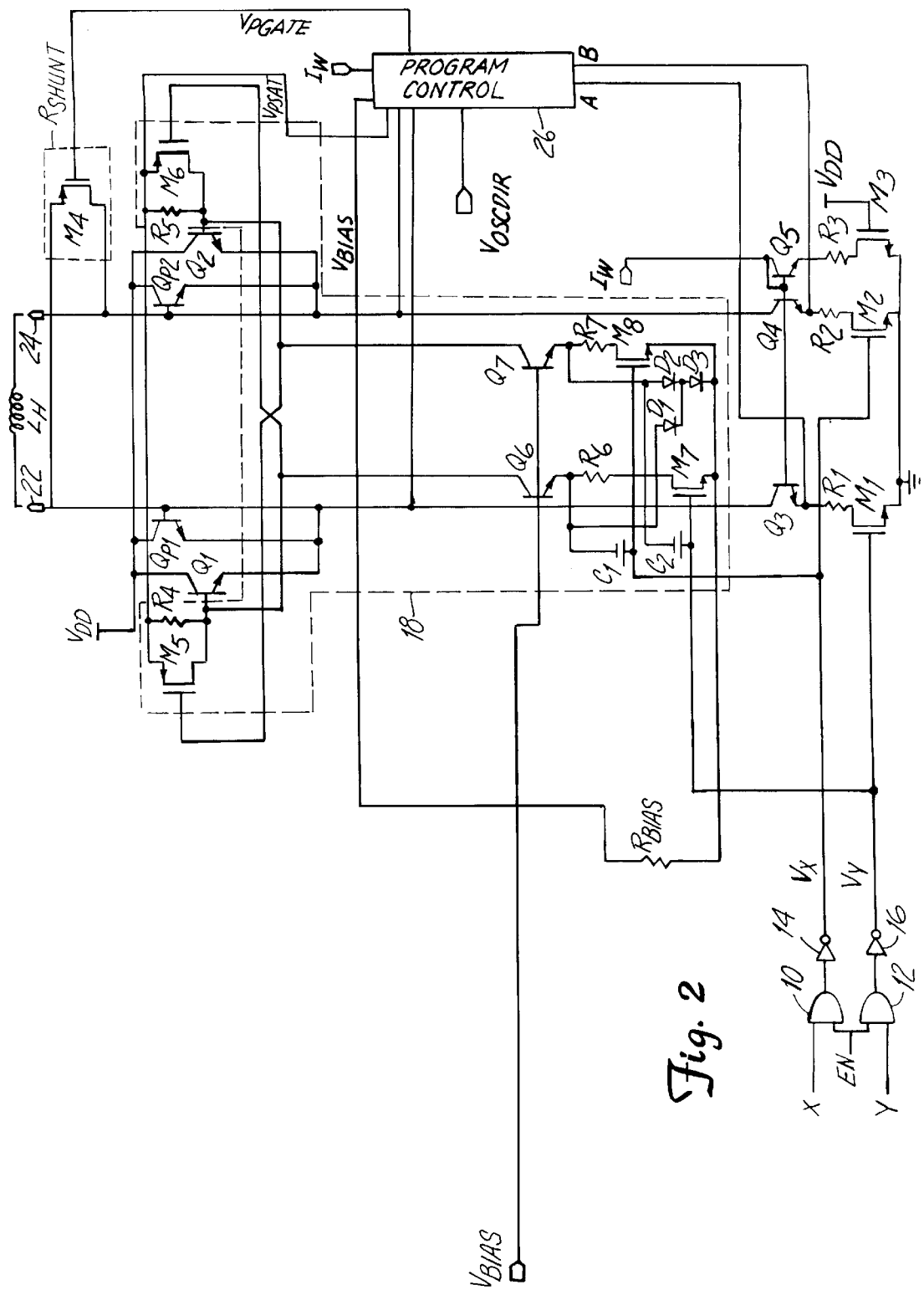
FIG. 2 is a circuit diagram of an H-switch write current driver circuit showing the connection of overshoot/undershoot control circuitry and upper H-switch control circuitry according to an embodiment of the present invention.

FIG. 2 is a circuit diagram of an H-switch write current driver circuit showing the connection of overshoot/undershoot control circuitry and upper H-switch control circuitry 18 according to an embodiment of the present invention. Data signals representing data to be recorded are provided at terminals X and Y to the inputs of respective AND gates 10 and 12, the second input of each AND gate 10 and 12 being connected to receive a write enable signal. The data signals are inverted by inverters 14 and 16 to derive transistor driving signals $V_X$ and $V_Y$ which are supplied to control the write driver circuit. Specifically, $V_X$ is supplied to the gate of MOSFET $M_2$ to selectively operate transistor $Q_4$, which forms a current mirror along with transistor $Q_5$. Similarly, $V_Y$ is supplied to the gate of MOSFET $M_1$ to selectively operate transistor $Q_3$, which also forms a current mirror along with transistor $Q_5$. Transistor $Q_5$ is constantly operated to conduction by connecting the gate of MOSFET $M_3$ to voltage source $V_{DD}$.

Transistor driver signals $V_X$ and $V_Y$ also drive upper H-switch control circuitry 18. Upper H-switch control circuitry 18 includes MOSFETs $M_7$ and $M_8$, optional degeneration resistors $R_6$ and $R_7$, transistors $Q_6$ and $Q_7$, capacitors $C_1$ and $C_2$ and diodes $D_1$, $D_2$ and $D_3$. Upper H-switch control circuitry 18 is configured as a dual-output current mirror with capacitors $C_1$ and $C_2$ provided to boost the output current when the current mirror initially turns on. For example, when the input $V_Y$ is switched to a high level to turn MOSFET $M_7$ on, the opposite input $V_X$ switches low, which drives a current pulse through capacitor $C_1$ and thereby increases the current in the emitter of transistor $Q_6$. This increase in current pulled through transistor $Q_6$ serves to pull down the voltage at the base of the upper H-switch transistor $Q_1$ more quickly, to improve the turn-off time of transistor $Q_1$ and thereby improve the performance of H-switch. Similarly, when the input $V_X$ switches to a high level to turn MOSFET $M_8$ on, the opposite input $V_Y$ switches low, which drives a current pulse through capacitor $C_2$ and thereby increases the current in the emitter of transistor $Q_7$. This increase in current pulled through transistor $Q_7$ serves to pull down the voltage at the base of upper H-switch transistor $Q_2$ more quickly, to improve the tun-off time of transistor $Q_2$. Diodes $D_1$, $D_2$ and $D_3$ provide clamping for capacitors $C_1$ and $C_2$ in the positive direction so that the capacitors are able to accommodate the next negative transition from a high voltage level to a low voltage level at inputs $V_X$ and $V_Y$.

While one of the upper H-switch transistors must be pulled down quickly upon switching, the opposite H-switch transistor must turn on quickly to switch the direction of current flowing through the write head. In order to achieve this goal, the voltage at the base of upper H-switch transistor $Q_1$ or $Q_2$ must be pulled up quickly during a transition. This is accomplished by providing pull-up resistors $R_4$ and $R_5$ connected between the respective bases of upper H-switch transistors $Q_1$ and $Q_2$ and a high voltage $V_{PSAT}$. An additional current path between the base of transistor $Q_1$ and $V_{PSAT}$ is provided by PMOSFET $M_5$, and an additional current path between the base of transistor $Q_2$ and $V_{PSAT}$ is provided by PMOSFET $M_6$. The gate of PMOSFET $M_5$ is connected directly to the opposite side of the upper H-switch driver (to the base of transistor $Q_2$), and the gate of PMOSFET $M_6$ is likewise connected directly to the base of transistor $Q_1$. Thus, when it is desirable to drive one of the PMOSFETs to maximum conduction, the opposite upper H-switch transistor base voltage will have already been pulled down toward ground, resulting in a maximum voltage difference between the gate and the source of the active PMOSFET and therefore maximum pull-up of the voltage at the base of the upper H-switch transistor to turn it on. After the transition has been completed, the voltage at the base of the opposite H-switch transistor is pulled back up by one of transistors $Q_{P1}$ and $Q_{P2}$, which decreases the driving of the active PMOSFET and thereby preserves the reliability of the PMOSFET devices by only driving them to maximum conduction immediately following a transition.

Program control block 26 is connected at various points throughout the schematic. The circuitry contained in program control block 26 is described in greater detail in FIGS. 3A, 3B and 3C, which are edge-matched as shown in FIG. 4. Program control block 26 provides a $V_{PGATE}$ signal that is connected to the base of PMOSFET $M_4$. PMOSFET $M_4$ is connected between head terminals 22 and 24 in parallel with the write head $L_H$. The $V_{PGATE}$ signal is related to the voltage across the head, so that when the voltage difference between terminals 22 and 24 is large, PMOSFET $M_4$ is activated to serve as a shunt resistor to divert current from flowing through the head. By activating PMOSFET $M_4$ at the proper time, the diversion of current may be used to reduce overshoot in the write current waveform, and utilizing a PMOSFET device provides a real termination impedance which helps to reduce overshoot and therefore reduces undershoot and ringing in the system as well.

Figure 3A:
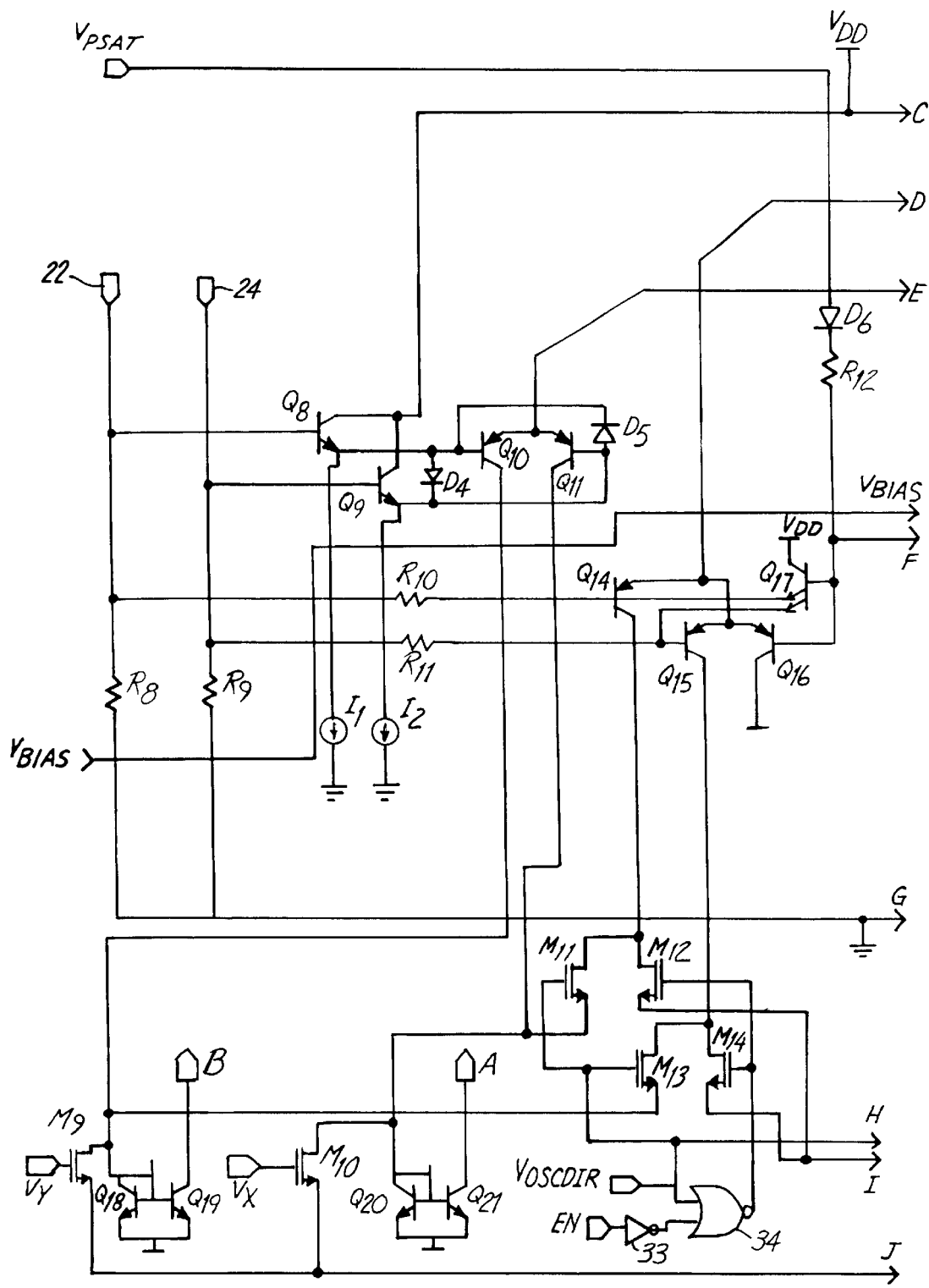
Figure 3B:
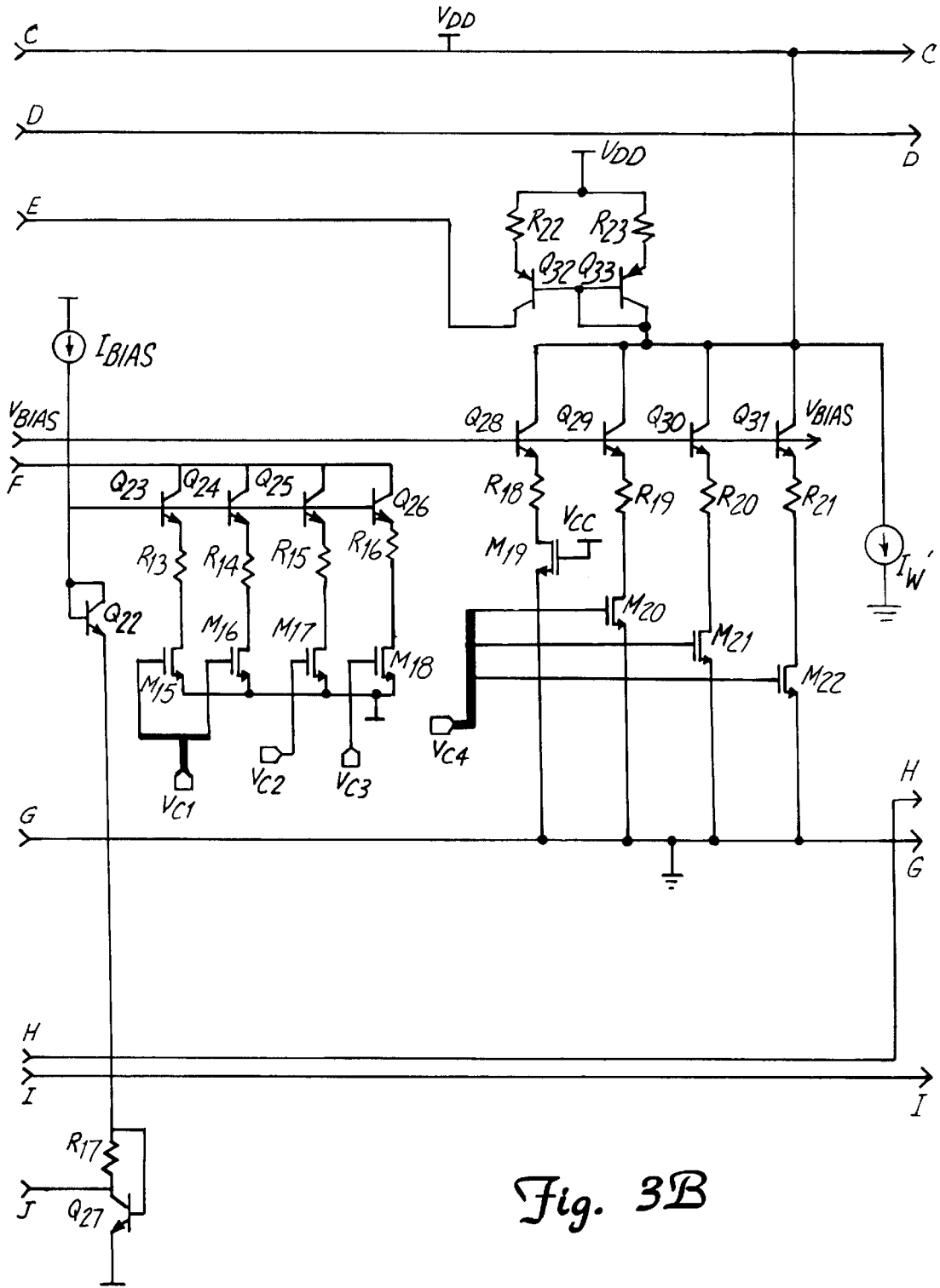

FIGS. 3A, 3B and 3C together form a circuit diagram showing the overshoot/undershoot control circuitry of an embodiment of the present invention. The circuit diagram formed by FIGS. 3A, 3B and 3C is edge-matched as shown in FIG. 4, with connection nodes labeled C–J to clarify the connections made therein. Transistors $Q_8$, $Q_9$, $Q_{10}$ and $Q_{11}$ form a voltage monitor to provide a current output at the collector of one of transistors $Q_{10}$ and $Q_{11}$ based on which of terminals 22 and 24 has a higher voltage. Transistor $Q_8$ has its base connected to head terminal 22 and its emitter connected to current source $I_1$, and transistor $Q_9$ has its base connected to head terminal 24 and its emitter connected to current source $I_2$. PNP transistor $Q_{10}$ is provided with its base connected to the emitter of transistor $Q_8$, and PNP transistor $Q_{11}$ is provided with its base connected to the emitter of transistor $Q_9$ and with its emitter connected to the emitter of PNP transistor $Q_{10}$. Diode $D_4$ is connected between the base of PNP transistor $Q_{10}$ and the emitter of transistor $Q_9$, and diode $D_5$ is connected between the base of PNP transistor $Q_{11}$ and the emitter of transistor $Q_8$. Diodes $D_4$ and $D_5$ are provided to clamp the differential voltage at the bases of PNP transistors $Q_{10}$ and $Q_{11}$ to two diode drops and thereby ensure efficient operation of the circuit. Transistors $Q_8$ and $Q_9$ are connected as followers to couple the bases of PNP transistors $Q_{10}$ and $Q_{11}$ to respective head pins 22 and 24. Resistors $R_8$ and $R_9$ are tied to respective head pins 22 and 24 to pull the head pins down to ground when the head is biased off.

PNP transistors $Q_{10}$ and $Q_{11}$ are connected to conduct current based on the difference in voltage between head terminals 22 and 24. When the voltage at terminal 22 is greater than the voltage at terminal 24, PNP transistor $Q_{11}$ is operated to conduct a programmed current from its collector along a current path to a current mirror formed by transistors $Q_{20}$ and $Q_{21}$, which is operable to mirror the programmed current to terminal A. As shown in FIG. 2, terminal A is connected to the emitter of transistor $Q_3$. When the voltage at terminal 24 is greater than the voltage at terminal 22, PNP transistor $Q_{10}$ is operated to conduct a programmed current along a current path to a current mirror formed by transistors $Q_{18}$ and $Q_{19}$ which is operable to mirror the programmed current to terminal B. As shown in FIG. 2, terminal B is connected to the emitter of transistor $Q_4$. MOSFET $M_9$ is provided with its gate connected to input voltage signal $V_Y$, and provides a shunt current path to "steal" the conduction current from transistor $Q_{10}$ and to bias the current mirror formed by transistors $Q_{18}$ and $Q_{19}$ close to conduction for fast turn-on time during its next "on" cycle. Similarly, MOSFET $M_{10}$ is provided with its gate connected to input voltage signal $V_X$, and provides a shunt current path to "steal" the conduction current from transistor $Q_{11}$ and to bias the current mirror formed by transistors $Q_{20}$ and $Q_{21}$ close to conduction for fast turn-on time during its next "on" cycle.

In operation, when the input control voltages switch to indicate a transition in write current direction, the voltage at one of the head pins initially goes low due to inductive kick, then actually goes to a higher voltage level than the other head pin. As the head pin voltage settles to its final value, there is some ringing and undershoot that occurs - that is, instead of settling directly to the final head pin voltage, the head pin voltage waveform oscillates somewhat above and below the final value. This oscillation of head pin voltage causes a corresponding oscillation of write current above and below its quiescent value. The amount of write current oscillation below the final value is referred to as undershoot. By reducing undershoot, the write current will settle to its quiescent value more rapidly.

According to the present invention, a current is injected during a transition period to adjust the write current during the time when one head pin rises to a higher voltage level than the other head pin. This current injection is effective to reduce write current undershoot, which reduces the overall settling time of the write current transition. The appropriate voltage level condition at the head terminals is detected by the circuitry shown in FIG. 3A. One condition of interest is defined by a period when the voltage at terminal 22 is greater than the voltage at terminal 24 and the input signal $V_X$ is low (that is, X (FIG. 1) is high)). When the voltage at terminal 22 is greater than the voltage at terminal 24, a current flows through PNP transistor $Q_{11}$ along the current path to the current mirror formed by transistors $Q_{20}$ and $Q_{21}$. However, to ensure that this current is mirrored into the H-switch circuit at the appropriate time, MOSFET $M_{10}$ is connected in a parallel current path, driven by input signal $V_X$. When $V_X$ is at a high voltage level, MOSFET $M_{10}$ is driven to conduct current so that the current mirror (transistors $Q_{20}$ and $Q_{21}$,) does not inject current into the H-switch circuit. The other condition of interest is defined by a period when the voltage at terminal 24 is greater than the voltage at terminal 22 and the input signal $V_Y$ is low (that is, Y (FIG. 1) is high)). When the voltage at terminal 24 is greater than the voltage at terminal 22, a current flows through PNP transistor $Q_{10}$ along the current path to the current mirror formed by transistors $Q_{18}$ and $Q_{19}$. However, to ensure that this current is mirrored into the H-switch circuit at the appropriate time, MOSFET $M_9$ is connected in a parallel current path, driven by input signal $V_Y$. When $V_Y$ is at a high voltage level, MOSFET $M_9$ is driven to conduct current so that the current mirror (transistors $Q_{18}$ and $Q_{19}$) does not inject current into the H-switch circuit. Therefore, undershoot control is only effected when $V_{22}>V_{24}$ and $V_X$ is low, or when $V_{24}>V_{22}$ and $V_Y$ is low.

The amount of undershoot control current flowing from PNP transistors $Q_{10}$ and $Q_{11}$ is programmed and controlled by transistors $Q_{28}$, $Q_{29}$, $Q_{30}$ and $Q_{31}$, MOSFETS $M_{19}$, $M_{20}$, $M_{21}$ and $M_{22}$, and resistors $R_{18}$, $R_{19}$, $R_{20}$ and $R_{21}$ shown in FIG. 3B. A minimum undershoot control current is set by a current (indicated by $I_W'$) related to the write current, and by a current flowing through transistor $Q_{28}$, resistor $R_{18}$ and MOSFET $M_{19}$, which has a gate connected to $V_{cc}$ to keep it constantly conducting. In an exemplary embodiment, when the write current is 40 mA, the constant current $I_W'$ related to the write current is approximately 200 $\mu$A and the constant current flowing through transistor $Q_{28}$, resistor $R_{18}$ and MOSFET $M_{19}$ is approximately 200 $\mu$A. Additional undershoot control current is set by three bits provided at input terminal $V_{C4}$ coupled to the gates of MOSFETS $M_{20}$, $M_{21}$ and $M_{22}$. Setting the most significant bit, which is coupled to the gate of MOSFET $M_{20}$, causes current to flow through transistor $Q_{29}$, resistor $R_{19}$ and MOSFET $M_{20}$. Setting the next most significant bit, which is coupled to the gate of MOSFET $M_{21}$, causes current to flow through transistor $Q_{30}$, resistor $R_{20}$ and MOSFET $M_{21}$. Setting the least significant bit, which is coupled to the gate of MOSFET $M_{22}$, causes current to flow through transistor $Q_{31}$, resistor $R_{21}$ and MOSFET $M_{22}$. In an exemplary embodiment, the currents provided by each of the three transistors $Q_{29}$, $Q_{30}$ and $Q_{31}$ are 600 $\mu$A, 300 $\mu$A and 150 $\mu$A, respectively, so that the three input bits selectively provide an additional undershoot control current ranging from 150 μA to 1050 μA (in 150 μA increments).

A second comparator for monitoring the voltages of write head terminals 22 and 24 is provided by PNP transistors $Q_{14}$, $Q_{15}$ and $Q_{16}$. The base of PNP transistor $Q_{14}$ is connected through resistor $R_{10}$ to terminal 22, and the base of PNP transistor $Q_{15}$ is connected through resistor $R_{11}$ to terminal 24. In addition to resistors $R_{10}$ and $R_{11}$, dual-emitter transistor $Q_{17}$ is connected with its collector tied to $V_{DD}$ and its emitters tied to the bases of PNP transistors $Q_{14}$ and $Q_{15}$, to clamp the voltages at the bases of PNP transistors $Q_{14}$ and $Q_{15}$, and to provide a nominal delay from the head terminal voltages and the comparator due to the parasitics of resistors $R_{10}$ and $R_{11}$. The voltage at each of the head terminals 22 and 24 is compared to reference voltage at some level below the supply voltage, set by diode $D_6$, resistor $R_{12}$ and some switchable currents controlled by transistors $Q_{23}$, $Q_{24}$, $Q_{25}$ and $Q_{26}$, resistors $R_{13}$, $R_{14}$, $R_{15}$ and $R_{16}$, MOSFETS $M_{15}$, $M_{16}$, $M_{17}$ and $M_{18}$ and control inputs $V_{C1}$, $VC_{C2}$ and $V_{C3}$ (FIG. 3B). These currents may be adjusted to control the threshold voltage for triggering the overshoot control of the present invention.

Currents flowing from PNP transistors $Q_{14}$ and $Q_{15}$ are coupled to a control network comprising MOSFETS $M_{11}$, $M_{12}$, $M_{13}$ and $M_{14}$. The control network is regulated by a $V_{OSCDIR}$ signal that indicates whether overshoot is to be increased or decreased. The $V_{OSCDIR}$ signal is connected to the gates of MOSFETS $M_{11}$ and $M_{13}$, and is coupled to an input of NOR gate 34. Enable signal EN is inverted by inverter 33 and coupled to the other input of NOR gate 34. The output of NOR gate 34 is connected to the gates of MOSFETS $M_{12}$ and $M_{14}$. Therefore, when the $V_{OSCDIR}$ signal is set high (indicating an increase in overshoot is desired), the currents flowing from PNP transistors $Q_{14}$ and $Q_{15}$ are routed through MOSFETS $M_{11}$ and $M_{13}$ to the current mirrors formed by transistors $Q_{18}$ and $Q_{19}$ and by transistors $Q_{20}$ and $Q_{21}$, to inject current into the H-switch in a similar manner as in the undershoot control as described above. However, to increase overshoot, the current is injected at an earlier time to boost the switching write current waveform to a higher level. The proper timing is ascertained based on the voltage comparator described above, enabling the injection of current once the head voltage drops below a threshold reference voltage.

When the $V_{OSCDIR}$ signal is set low (indicating a decrease in overshoot is desired), the currents flowing from PNP transistors $Q_{14}$ and $Q_{15}$ are routed through MOSFETs $M_{12}$ and $M_{14}$ and summed into the current mirror formed by transistors $Q_{40}$ and $Q_{41}$ (FIG. 3C). The gain of the current mirror is set by resistors $R_{30}$ and $R_{31}$. The output of the current mirror is connected through diode-connected transistor $Q_{42}$ and diode-connected PMOSFET $M_{27}$ to establish the voltage at the $V_{PGATE}$ node. The $V_{PGATE}$ node is connected to the gate of PMOSFET $M_4$ (FIG. 2) which is connected between write head terminals 22 and 24 to provide a shunting resistor to damp overshoot in the write current waveform. The shunting resistor is generically shown as $R_{shunt}$ in FIGS. 1 and 2.

The amount of the current flowing from PNP transistors $Q_{14}$ and $Q_{15}$ to effect overshoot control may be programmed and controlled by transistors $Q_{34}$, $Q_{35}$, $Q_{36}$ and $Q_{37}$, resistors $R_{24}$, $R_{25}$, $R_{26}$ and $R_{27}$, and MOSFETs $M_{23}$, $M_{24}$, $M_{25}$ and $M_{26}$. A minimum overshoot control current is set by transistor $Q_{37}$, resistor $R_{27}$ and MOSFET $M_{26}$, which is driven to conduction based on a high $V_{OSCDIR}$ signal, indicating that an increase in overshoot is desired. Therefore, when overshoot is to be decreased, MOSFET $M_{26}$ is off, and the minimum overshoot control current is zero. In an exemplary embodiment, the minimum overshoot control current when overshoot is to be increased is approximately 250 μA. Additional overshoot control current is set by three bits provided at input terminal $V_{C5}$ coupled to the gates of MOSFETs $M_{23}$, $M_{24}$ and $M_{25}$. Setting the most significant bit, which is coupled to the gate of MOSFET $M_{23}$, causes current to flow through transistor $Q_{34}$, resistor $R_{24}$ and MOSFET $M_{23}$. Setting the next most significant bit, which is coupled to the gate of MOSFET $M_{24}$, causes current to flow through transistor $Q_{35}$, resistor $R_{25}$ and MOSFET $M_{24}$. Setting the least significant bit, which is coupled to the gate of MOSFET $M_{25}$, causes current to flow through transistor $Q_{36}$, resistor $R_{26}$ and MOSFET $M_{25}$. In an exemplary embodiment, the currents provided by each of the transistors $Q_{34}$, $Q_{35}$ and $Q_{36}$ are 1000 μA, 500 μA and 250 μA, respectively, so that the three input bits selectively provide an additional overshoot control current ranging from 250 μA to 1750 μA (in 250 μA increments).

The present invention therefore provides undershoot and overshoot control circuitry that is able to programmably control the amount of overshoot and undershoot in a write current waveform, so as to enhance the efficiency of a write driver circuit and its ability to quickly change directions of write current through a write head. In essence, the undershoot and overshoot control circuitry has three components. The first component is an undershoot reduction circuit, which adds current to the write current when one head terminal has a voltage higher than the opposite head terminal and the input signals are in a certain state, indicating that the write current waveform is about to experience some level of undershoot. The second component is an overshoot enhancement circuit, which adds current to the write current when one of the head terminals has a voltage lower than a predetermined threshold, indicating that the write current waveform is about to experience some level of overshoot. The third component is an overshoot reduction circuit, which provides a resistance between the head terminals in parallel with the write head to reduce overshoot. The resistance is provided when one of the head terminals has a voltage lower than a predetermined threshold, indicating that the write current waveform is about to experience some level of overshoot. The predetermined thresholds, the currents added to the write current, and the resistance provided are all programmable in one embodiment, so that the undershoot and overshoot of the write driver circuit may be precisely controlled for efficient operation.

Although the present invention has been described with reference to preferred embodiments, workers skilled in the art will recognize that changes may be made in form and detail without departing from the spirit and scope of the invention.

What is claimed is:

1. In a write current driver circuit including a switching mechanism directing write current in opposite directions through a write head between first and second terminals, the improvement of overshoot control circuitry comprising:
   a monitoring circuit for detecting a voltage at the first and second terminals; and
   an overshoot enhancement circuit responsive to the monitoring circuit to add an overshoot control current to the write current upon detection of a voltage at one of the first and second terminals below a predetermined threshold to increase overshoot of the write current.

2. The apparatus of claim 1, wherein the overshoot control current is programmable.

3. The apparatus of claim 1, wherein the predetermined threshold is programmable.

4. The apparatus of claim 1, wherein the monitoring circuit comprises a comparator circuit coupled to the first and second terminals, the comparator circuit providing overshoot control current in a first current path in response to a voltage at the first terminal below the predetermined threshold and providing overshoot control current in a second current path in response to a voltage at the second terminal below the predetermined threshold.

5. The apparatus of claim 4, wherein the comparator circuit comprises:
- a first transistor having a control element coupled to the first terminal;
- a second transistor having a control element coupled to the second terminal;
- a third transistor having a control element coupled to a reference voltage and a controlled element coupled to the first and second transistors to drive the first transistor to conduct overshoot control current in the first current path when a voltage at the control element of the first transistor is less than the reference voltage and to drive the second transistor to conduct overshoot control current in the second current path when a voltage at the control element of the second transistor is less than the reference voltage; and
- means for setting the reference voltage to a predetermined value.

6. The apparatus of claim 1, wherein the overshoot control circuitry further comprises:
- an overshoot reduction circuit responsive to the monitoring circuit to provide a resistance between the first and second terminals in parallel with the write head upon detection of a voltage at one of the first and second terminals below the predetermined threshold; and
- a control input coupled to the overshoot enhancement circuit and the overshoot reduction circuit to selectively activate one of the overshoot enhancement circuit and the overshoot reduction circuit.

7. The apparatus of claim 6, wherein the resistance provided by the overshoot reduction circuit is programmable.

8. The apparatus of claim 6, wherein the predetermined threshold is programmable.

9. The apparatus of claim 6, wherein the overshoot reduction circuit comprises a voltage-establishing circuit and the resistance provided by the overshoot reduction circuit comprises at least one MOSFET coupled between the first and second terminals, the at least one MOSFET having a control element coupled to the voltage-establishing circuit.

10. In a write current driver circuit including a switching mechanism controlled by complementary first and second input signals to direct write current in opposite directions through a write head between first and second terminals, the improvement of undershoot control circuitry comprising:
- a monitoring circuit for detecting a voltage difference between the first and second terminals;
- an undershoot reduction circuit responsive to the monitoring circuit to add an undershoot reduction current to the write current based on a state of the first and second input signals and a detected voltage difference between the first and second terminals.

11. The apparatus of claim 10, wherein the undershoot reduction current is programmable.

12. The apparatus of claim 10, wherein the monitoring circuit comprises a comparator circuit coupled to the first and second terminals, the comparator circuit providing undershoot reduction current in a first current path when a voltage at the first terminal exceeds a voltage at the second terminal and providing undershoot control current in a second current path when a voltage at the second terminal exceeds a voltage at the first terminal.

13. The apparatus of claim 12, wherein the comparator circuit comprises:
- a first transistor having a first controlled element coupled to a source of undershoot reduction current, a second controlled element coupled to the first current path, and a control element coupled to the first terminal; and
- a second transistor having a first controlled element coupled to the source of undershoot reduction current, a second controlled element coupled to the second current path, and a control element coupled to the second terminal.

14. The apparatus of claim 10, further comprising:
- a second monitoring circuit for detecting a voltage at the first and second terminals; and
- an overshoot enhancement circuit responsive to the second monitoring circuit to add an overshoot control current to the write current upon detection of a voltage at one of the first and second terminals below a predetermined threshold.

15. The apparatus of claim 14, wherein the overshoot enhancement current is programmable.

16. The apparatus of claim 14, wherein the predetermined threshold is programmable.

17. The apparatus of claim 14, further comprising:
- an overshoot reduction circuit responsive to the second monitoring circuit to provide a resistance between the first and second terminals in parallel with the write head upon detection of a voltage at one of the first and second terminals below the predetermined threshold; and
- a control input coupled to the overshoot enhancement circuit and the overshoot reduction circuit to selectively activate one of the overshoot enhancement circuit and the overshoot reduction circuit.

18. The apparatus of claim 17, wherein the resistance provided by the overshoot reduction circuit is programmable.

19. The apparatus of claim 17, wherein the predetermined threshold is programmable.

20. A method of increasing overshoot in a write current flowing through a write head between first and second terminals, the method comprising:
- detecting a voltage at the first and second terminals; and
- adding an overshoot control current to the write current upon detection of a voltage at one of the first and second terminals below a predetermined threshold.

21. A method of reducing undershoot in a write current flowing through a write head between first and second terminals in a direction controlled by complementary first and second input signals, the method comprising:
- detecting a voltage difference between the first and second terminals; and
- adding an undershoot reduction current to the write current based on a state of the first and second input signals and a detected voltage difference between the first and second terminals.

22. The method of claim 21, further comprising:
- detecting a voltage at the first and second terminals; and
- adding an overshoot control current to the write current upon detection of a voltage at one of the first and second terminals below a predetermined threshold.

23. The method of claim 21, further comprising:

detecting a voltage at the first and second terminals; and providing a resistance between the first and second terminals in parallel with the write head upon detection of a voltage at one of the first and second terminals below a predetermined threshold.

24. A write current driver circuit comprising:

first and second terminals;

a write head connected between the first and second terminals;

a switching mechanism directing write current in opposite directions through the write head, the switching mechanism being controlled by complementary first and second input signals; and means for reducing undershoot of the write current based on a voltage difference between the first and second terminals and a state of the first and second input signals.

* * * * *